United States Patent
Fout et al.

(10) Patent No.: US 9,518,435 B2
(45) Date of Patent: Dec. 13, 2016

(54) DRILLING FLUID PROCESSING

(71) Applicant: M-I L. L. C., Houston, TX (US)

(72) Inventors: Gary Fout, Cypress, TX (US); Michael Savoy, Liberty, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 14/240,604

(22) PCT Filed: Oct. 1, 2012

(86) PCT No.: PCT/US2012/058274
§ 371 (c)(1),
(2) Date: Feb. 24, 2014

(87) PCT Pub. No.: WO2013/049802
PCT Pub. Date: Apr. 4, 2013

(65) Prior Publication Data
US 2014/0371113 A1    Dec. 18, 2014

Related U.S. Application Data

(60) Provisional application No. 61/541,763, filed on Sep. 30, 2011.

(51) Int. Cl.
*E21B 21/06* (2006.01)
*C09K 8/24* (2006.01)
(Continued)

(52) U.S. Cl.
CPC .............. *E21B 21/065* (2013.01); *C09K 8/24* (2013.01); *E21B 21/062* (2013.01);
(Continued)

(58) Field of Classification Search
CPC .... E21B 21/062; E21B 21/065; E21B 21/066; C09K 8/24; B01D 21/02; B01D 21/262
(Continued)

(56) References Cited

U.S. PATENT DOCUMENTS 2,142,947 A   1/1939 Kretzschmar et al.
2,378,323 A   6/1945 Pomeroy
(Continued)

FOREIGN PATENT DOCUMENTS

JP   2002028699 A   1/2002
JP   2002336872 A   11/2002
(Continued)

*Primary Examiner* — Frances Tischler
(74) *Attorney, Agent, or Firm* — David J. Smith

(57) ABSTRACT

A method of processing a return oil-based drilling fluid includes centrifuging a primarily fluids phase at a first speed and separating the primarily fluids phase into a first effluent and a first residual, centrifuging the first effluent at a second speed and separating the first effluent into a second effluent and a second residual, and centrifuging the second effluent at a third speed and separating the second effluent into a third effluent and a third residual. A surfactant, a polymer, combinations of surfactant(s) and polymer(s) and/or a wash water may be added to one or more of the return oil-based drilling fluid, the primarily fluids phase, the primarily solids phase, the first effluent, the second effluent, and the third effluent.

14 Claims, 5 Drawing Sheets

(51) Int. Cl.
*B01D 21/02* (2006.01)
*B01D 21/26* (2006.01)

(52) U.S. Cl.
CPC ............ *E21B 21/066* (2013.01); *B01D 21/02* (2013.01); *B01D 21/262* (2013.01)

(58) Field of Classification Search
USPC ........ 507/117, 203; 210/609, 770, 772, 787, 210/639
See application file for complete search history.

(56) References Cited

U.S. PATENT DOCUMENTS

| | | |
|---|---|---|
| 3,853,616 A | 12/1974 | Rundell et al. |
| 4,100,614 A | 7/1978 | Mandt |
| 4,210,166 A | 7/1980 | Munie |
| 4,470,907 A | 9/1984 | Sencza |
| 4,518,261 A | 5/1985 | Sekimoto et al. |
| 4,710,304 A | 12/1987 | Lang |
| 4,830,757 A | 5/1989 | Lynch et al. |
| 4,855,061 A | 8/1989 | Martin |
| 5,145,256 A | 9/1992 | Wiemers et al. |
| 5,552,038 A | 9/1996 | Muller et al. |
| 5,614,102 A | 3/1997 | Sakurada |
| 5,643,460 A | 7/1997 | Marble et al. |
| 5,814,230 A | 9/1998 | Willis et al. |
| 6,079,911 A | 6/2000 | Wangermann et al. |
| 6,585,115 B1 | 7/2003 | Reddoch et al. |
| 6,620,317 B2 | 9/2003 | Alviti |
| 6,652,757 B2 | 11/2003 | Hodges et al. |
| 6,805,803 B1 | 10/2004 | Weir et al. |
| 6,881,349 B2 | 4/2005 | Mueller |
| 7,135,107 B2 | 11/2006 | Palmer |
| 7,276,154 B1 | 10/2007 | Schaefer et al. |
| 7,338,608 B2 | 3/2008 | Adams et al. |
| 7,338,617 B2 | 3/2008 | Koga et al. |
| 7,381,332 B2 | 6/2008 | Pena et al. |
| 7,401,973 B1 | 7/2008 | Lott |
| 7,568,535 B2 | 8/2009 | Larson et al. |
| 7,736,497 B2 | 6/2010 | Fout et al. |
| 7,901,571 B2 | 3/2011 | Woods et al. |
| 8,002,991 B2 | 8/2011 | Fout et al. |
| 2006/0225924 A1* | 10/2006 | Ivan et al. ............... 175/66 |
| 2007/0278012 A1 | 12/2007 | Smith |

FOREIGN PATENT DOCUMENTS

| | | |
|---|---|---|
| JP | 2006175427 A | 7/2006 |
| KR | 1020040089469 A | 10/2004 |
| WO | 2006110691 A1 | 10/2006 |

\* cited by examiner

DRILLING FLUID PROCESSING

BACKGROUND

Background Art

In the drilling of wells, a drill bit is used to dig many thousands of feet into the earth's crust. Oil rigs employ a derrick that extends above the well drilling platform. The derrick supports joint after joint of drill pipe connected end-to-end during the drilling operation. As the drill bit is pushed further into the earth, additional pipe joints are added to the ever lengthening "string" or "drill string". Therefore, the drill string typically includes a plurality of joints of pipe.

Fluid "drilling mud" is pumped from the well drilling platform, through the drill string, and to a drill bit supported at the lower or distal end of the drill string. The drilling mud lubricates the drill bit and carries away well cuttings generated by the drill bit as it digs deeper. The cuttings are carried in a return flow stream of drilling mud through the well annulus and back to the well drilling platform at the earth's surface. When the drilling mud reaches the platform, it is contaminated with small pieces of shale and rock that are known in the industry as well cuttings or drill cuttings. Once the drill cuttings, drilling mud, and other waste reach the platform, separation equipment is used to remove the drill cuttings from the drilling mud, so that the drilling mud may be reused. The remaining drill cuttings, waste, and residual drilling mud are then transferred to a holding container for immediate or future disposal.

Due to increasing environmental concerns and escalating disposal costs, there is growing incentive to reduce the volume of drilling wastes. At many drilling locations reserve pits are used to store drilling waste during land-based drilling operations. In certain areas that primarily use invert-emulsion drilling fluids, the waste drilling fluids stored in the reserve pits may contain hydrocarbons, solids material including colloidal particles, and free-water. In certain reserve pits, weak oil-in-water emulsions might also be present.

Despite many valuable contributions from the art, it would be beneficial to develop systems and methods that efficiently process oil-based return drilling fluids.

SUMMARY

In one aspect, embodiments disclosed herein relate to a method of processing a return oil-based drilling fluid including dividing the return oil-based drilling fluid into a primarily fluids phase and a primarily solids phase; centrifuging the primarily fluids phase at a first speed and separating the primarily fluids phase into a first effluent and a first residual; centrifuging the first effluent at a second speed, the second speed higher than the first speed, and separating the first effluent into a second effluent and a second residual; and centrifuging the second effluent at a third speed, the third speed higher than the second speed, and separating the second effluent into a third effluent and a third residual.

In another aspect, embodiments disclosed herein relate to a method of processing a return oil-based drilling fluid including adding a volume of a base oil fluid to the return oil-based drilling fluid, wherein the ratio of the volume of base oil fluid added to a volume of the return oil-based drilling fluid is between about 0.1 and 0.4; mixing the base oil fluid with the return oil-based drilling fluid to form a diluted return oil-based drilling fluid; adding a surfactant to the diluted return oil-based drilling fluid; and adding a polymer to the diluted return oil-based drilling fluid.

In another aspect, embodiments disclosed herein relate to method of processing a return oil-based drilling fluid including adding a base oil fluid to a primarily solids phase of the return oil-based drilling fluid, wherein a ratio of a volume of the base oil fluid added to a volume of the primarily solids phase is between 0.1 and 0.2; separating the primarily solids phase into diluted separated fluids and separated solids; adding a wash water to the separated solids; and removing treated solids from the wash water.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

In one aspect, embodiments disclosed herein relate to systems and methods for processing oilfield waste. Specifically, embodiments disclosed herein relate to systems and methods for processing a return oil-based drilling fluid. More specifically, embodiments disclosed herein relate to systems and methods for separating solid and liquid phases of oil-based drilling fluids.

Figure 1:
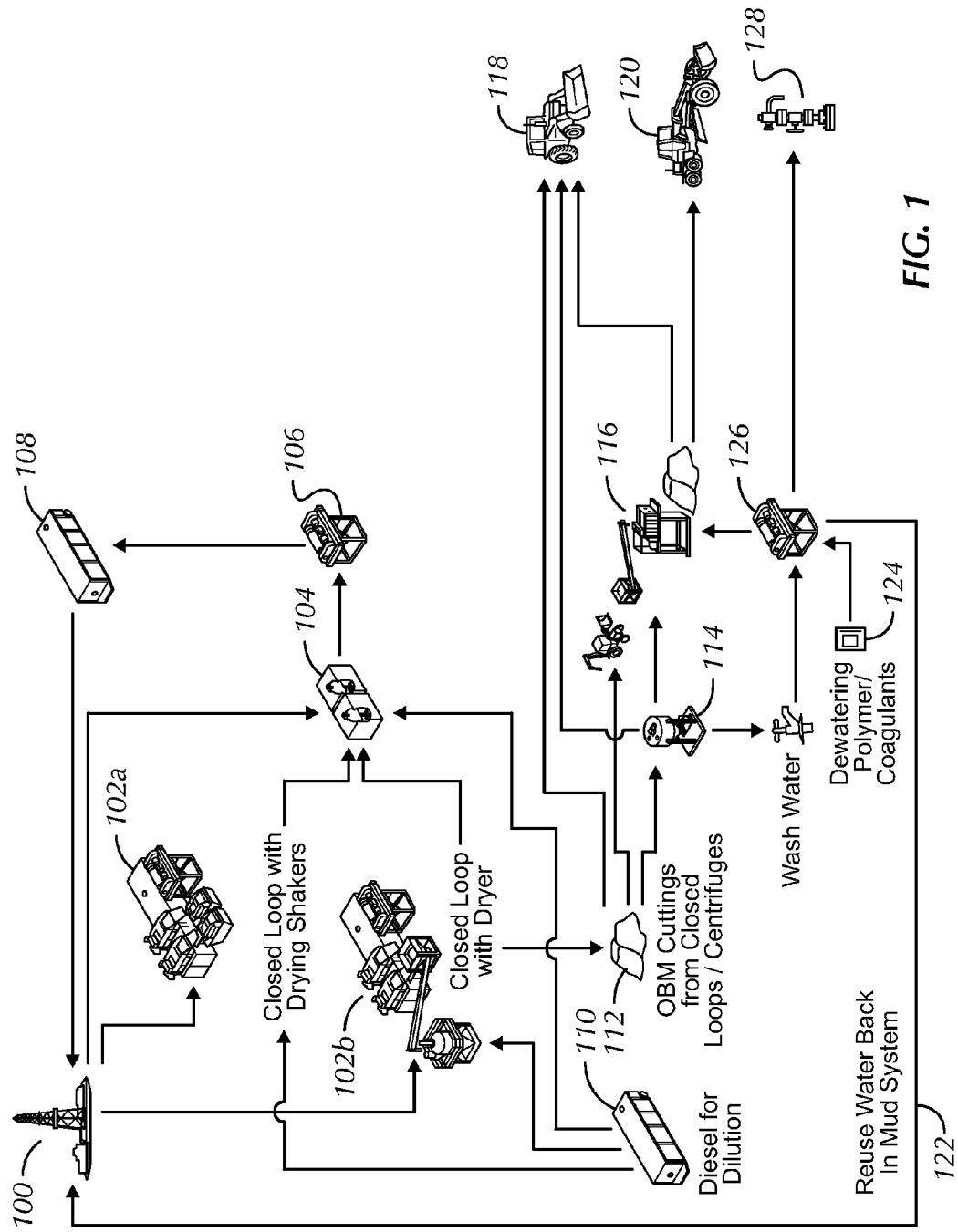
FIG. 1 is a diagram of a system for processing oilfield waste in accordance with embodiments of the present disclosure.

Referring initially to FIG. 1, a system for processing oilfield waste in accordance with embodiments of the present disclosure is shown. A drilling fluid used downhole during drilling of a wellbore is returned to the surface of the well at a drilling site 100. In one embodiment, the drilling fluid may be an oil-based drilling fluid; in other embodiments, the drilling fluid may be a water-based drilling fluid or a synthetic-based drilling fluid. While reference herein is made to an oil-based drilling fluid, one of ordinary skill in the art will appreciate that a water-based or synthetic-based drilling fluid may be processed with systems and methods in accordance with the present disclosure.

In one embodiment, a return drilling fluid may be directed from a drilling site 100 to a mixing tank 104. A volume of base fluid may be added to the return drilling fluid to dilute the return drilling fluid. In one embodiment, the return drilling fluid is a return oil-based drilling fluid. Accordingly, the base fluid added to the return oil-based drilling fluid is a base oil fluid. One of ordinary skill in the art will appreciate that the base oil fluid may include various base oils, for example, diesel, mineral oil, kerosene, etc. In some embodiments, the base oil fluid may be the same base oil fluid as the base oil of the return drilling fluid. In this embodiment, the processed return oil-based fluid may then be reused downhole after processing. The base oil fluid is mixed with the return oil-based drilling fluid to form a diluted return oil-based drilling fluid.

In one embodiment, the volume of base oil fluid added to the return oil-based drilling fluid is selected such that the base oil fluid added effectively breaks the emulsion of the return oil-based drilling fluid to allow for wetting of the cuttings. For example, in one embodiment, the ratio of the volume of the base oil fluid added to the volume of the return oil-based drilling fluid is greater than about 0.3. In other embodiments, the ratio of the volume of the base oil fluid added to the volume of the return oil-based drilling fluid is in a range of about 0.2 to 0.4, or a range of about 0.1 to 0.15, or a range of about 0.3 to 1.5. In yet other embodiments, the volume of the base oil fluid added to the volume of the return oil-based drilling fluid is approximately 1.0. In still other embodiments, the volume of the base oil fluid added to the volume of the return oil-based drilling fluid is approximately 0.5.

After the base oil fluid is added to the return oil-based drilling fluid a surfactant and/or polymer may be added to the mixing tank 104. In one embodiment, a surfactant may be added to the diluted return oil-based drilling fluid to water wet particulate matter entrained within the return oil-based drilling fluid. Surfactants which may be used in accordance with the present disclosure may include anionic, cationic and nonionic surfactants. The surfactant may be a low benzene or benzene-free surfactant. In some embodiments, the surfactant may be an oil-based stripping agent, for example a surfactant comprising 50% by weight D-Limonene and 50% by weight glycol. Other example surfactants may include sulfosuccinates, sulfosuccinamates, polyoxyethylene sorbitol fatty acids, sorbitan sesquioleate, polyoxyethylene sorbitan trioleate, sorbitan monooleate, polyoxyethylene (20) sorbitan monooleate, sodium dioctylsulfosuccinate, oleamidopropyldimethyl amine, sodium isostearyl-2-lactate, polyoxyethylene sorbitol monooleate or mixtures thereof and the like. Other surfactants known in the art, for example, those disclosed in U.S. Pat. Nos. 7,338,608, and 7,381,332, which are incorporated herein, may also be used.

In some embodiments, a polymer may be added to the diluted return oil-based drilling fluid after the surfactant is added to the diluted return oil-based drilling fluid. In other embodiments, the polymer may be added to the diluted return oil-based drilling fluid before the surfactant is added. In yet other embodiments, the surfactant and polymer may be added simultaneously. The polymer may be added to promote the formation of flocs, which may then be more readily separated from the diluted return oil-based drilling fluid. Various polymers may be injected into the return drilling fluid depending on the particular constitution of the drilling waste. Examples of polymers that may be used include cationic flocculants and petroleum distillates, as well as other flocculants capable of aggregating colloids entrained in the drilling waste, thereby allowing separation processes to remove the solids from the drilling waste. In some embodiments, the polymer may comprise a water-based blend of polyelectrolytes and surface active intermediates.

In one embodiment, the polymer may be a dry polymer. In this embodiment, the polymer may be hydrated before adding the polymer to the return oil-based drilling fluid by mixing water with the polymer in dry form. In one embodiment, the dry polymer may include a cationic water-soluble polymer. In some embodiments, the dry polymer does not contain metals or hydrocarbons.

The polymer may be hydrated by any system or method known in the art. For example, a feeder (e.g., a hopper with a screen and a rotating disc) may be connected to a polyductor 102, as disclosed in U.S. Pat. No. 8,002,991, incorporated by reference herein. Polyductor 102 may include a high efficiency eductor designed specifically for dry polymers. Generally, polyductor may generate a high vacuum airflow to transport dry polymer flocculant from the rotating disc of feeder. In such a system, polyductor may be connected to the feeder and may receive dry polymer therefrom. The polyductor may also be fluidly connected to a water supply line.

The polyductor may dilute the dry polymer using water accelerated in a high efficiency nozzle. The high velocity water flow may generate a vacuum by entraining air as it exits the nozzle. The high speed collision in the polyductor between the polymer granules and the water stream may allow dispersion of the polymer granules. Thus, use of the polyductor, as described above, may result in faster hydration and minimize the aging time for polymer activation.

In one embodiment, as dry polymer enters the polyductor, a water regulation valve may control the flow of water into the polyductor. In the polyductor, the water mixes with the dry polymer, and the resultant solution may be dispersed into an aging tank. In the aging tank, the polymer may age in accordance with the time requirements of the polymer being used. After proper aging, the polymer may be injected into the diluted return oil-based drilling fluid. The injection of the polymer into the used drilling fluid may be controlled by a programmable logic controller (PLC) to regulate the dispersion of the polymer into the return drilling fluid by controlling a polymer pump, a positive displacement pump, and/or a diaphragm pump.

In other embodiments, a water-in-oil emulsion comprising a polymer may be added to the return oil-based drilling fluid. The water-in-oil emulsion may include a polymer derived from at least one water-soluble monomer. In this embodiment, the polymer is not substantially solubilized or dissolved prior to contact with said return oil-based drilling fluid. The polymer in the water-in-oil emulsion may be cationic, anionic, or nonionic. Examples of water-soluble monomers that may be used include cationic, anionic or non-ionic monomers such as (alkyl)acrylamide, (alkyl) acrylic acid, N-vinylpyrrolidone, N-vinylacetamide, N-vinylformamide, acrylonitrile, fumaric acid, crotonic acid, maleic acid, hydroxyalkyl methacrylates, 2-acrylamido-2-alkylsulfonic acids wherein the alkyl group contains 1 to 6 carbon atoms, styrene sulfonic acids, vinyl sulfonic acids; and salts of any of the foregoing thereof; or monomers as described in U.S. Pat. Nos. 7,338,608 and 7,381,332.

In some embodiments, a cationic polyacrylamind emulsion may be added to the return oil-based drilling fluid. In one embodiment, a emulsion may include 0-5% by weight hexanedioic acid, 25.66-26.06% by weight distillates, petroleum, hydrotreated light, 39-41% by weight ethanaminium, N.N.N.-trimethyl-2-[(1-oxo-2-propenyl)oxy]-, chloride, polymer with 2-gropenamide, 1.77-2.17% by weight alcohols, C12-14-secondary, ethoxylated, and 0-5% by weight 1,2,3-propanetricarboxylic acid, 2-hydroxy-.

In other embodiments oil-in-water emulsions comprising a polymer may be used. Other flocculants and/or coagulants may also be used, including for example, inorganic coagulants including aluminum- and iron-based coagulants, such as aluminum chloride, poly(aluminum hydroxy)chloride, aluminum sulfate, ferric sulfate, ferric chloride, etc and combinations thereof. Still other coagulants may include water-soluble organic polymers that may be cationic, anionic, or non-ionic. Examples of cationic monomers may include diallyl dialkyl ammonium halides and dialkylaminoalkyl (meth)-acrylates and -acrylamides, (as acid addition or quaternary ammonium salts). In a particular embodiment, the coagulant may include poly diallyl dimethyl ammonium chloride, while in other embodiments, inorganic coagulants such as poly(aluminum hydroxy)chlorides may be used. Depending on the type of drilling waste being treated, the type of polymer used may vary. Thus, in certain embodiments, the polymer maybe include a flocculant or coagulant alone, while in other embodiments, combinations of flocculants and/or coagulants may be used.

In still other embodiments, a water-based blend of a surfactant and a polymer may be added to the return drilling fluid. For example, a water-based blend of two surfactants and a polymer may be used to facilitate coagulation or flocculation of particulate matter. Surfactants and polymers described above may be used in this embodiment.

Referring still to FIG. 1, after the surfactant and/or polymer are added to the diluted return oil-based drilling fluid, the diluted return oil-based drilling fluid is directed to a separator 106. The separator 106 separates a primarily solids phase from the return oil-based drilling fluid. In one embodiment, the separator 106 is a centrifuge. The centrifuge may include a decanting centrifuge which may include a bowl and conveyor assembly disposed within the bowl. Commercially available examples of centrifuges include the CD-500 Centrifuge and the 518 Centrifuge, both available from M-I L.L.C., a Schlumberger Company, Houston, Tex. In other embodiments, the separator 106 may be a settling tank or a coalescer. For example, in one embodiment, the diluted return oil-based drilling fluid may be directed to a settling tank and remain in the settling tank for a predetermined amount of time to allow water, solids, and oil to separate out. Each phase may then be separated. In another embodiment, the diluted return oil-based drilling fluid may be directed to a coalescer, which includes a series of plates in a tank. As the diluted return oil-based drilling fluid flows through the series of plates of the coalescer, the water phase of the diluted return oil-based drilling fluid drags along the surface of the plates to separate the water phase from the oil phase. In yet other embodiments, hydro cyclones may be used to separate phases of the diluted return oil-based drilling fluid.

A treated return oil-based drilling fluid may then be removed from the separator 106 and directed to a storage tank 108. The treated return oil-based drilling fluid may then be returned to an active drilling fluid system for use downhole. In other embodiments, the treated return oil-based drilling fluid may be added to a return oil-based drilling fluid as the base oil fluid discussed above. As such, the treated return oil-based drilling fluid may be reused downhole as a drilling fluid or may be used as a base oil to dilute a return drilling fluid from a drilling site 100. The solids phase removed from the separator 106 may be disposed of as will be discussed in more detail below.

Still referring to FIG. 1, in some embodiments, a first separator (not shown) may be located at the drilling site 100 and receive a return oil-based drilling fluid from the well and divide the return oil-based drilling fluid into a primarily fluids phase and a primarily solids phase. The first separator may include, for example, a shale shaker. For example, the first separator may be a scalping shaker to provide a coarse separation of cuttings from the return drilling fluid. In other embodiments, other separators known in the art, such as centrifuges, cyclones, filters, etc., may be used to provide an initial separation of the primarily solids phase and the primarily fluids phase of the return drilling fluid. The primarily solids phase and the primarily fluids phase may then each be processed separately. For example, the primarily fluids phase may be processed as described above, by directing the fluids phase to a mixing tank 104, adding a base oil fluid, and adding a surfactant and/or polymer to the primarily fluids phase of the return oil-based drilling fluid.

In accordance with embodiments disclosed herein, a volume of base oil fluid may be added to the primarily solids phase of the return oil-based drilling fluid. One of ordinary skill in the art will appreciate that the base oil fluid may be any base oil, for example, diesel, mineral oil, kerosene, etc. In some embodiments, the base oil fluid may be the same base oil fluid as the oil fluid of the return drilling fluid. The base oil fluid is mixed with the primarily solids phase of the return oil-based drilling fluid to form a diluted primarily solids phase.

In one embodiment, the volume of base oil fluid added to the primarily solids phase of the return oil-based drilling fluid is selected such that the base oil fluid added effectively breaks the emulsion of the return oil-based drilling fluid to allow for wetting of the primarily solids phase. For example, in one embodiment, the ratio of the volume of the base oil fluid added to the volume of the primarily solids phase of the return oil-based drilling fluid is greater than about 0.3. In other embodiments, the ratio of the volume of the base oil fluid added to the volume of the primarily solids phase of the return oil-based drilling fluid is in a range of about 0.2 to 0.4, or a range of about 0.1 to 0.15, or a range of about 0.3 to 1.5. In yet other embodiments, the volume of the base oil fluid added to the volume of the primarily solids phase of the return oil-based drilling fluid is approximately 1.0. In still other embodiments, the volume of the base oil fluid added to the volume of the primarily solids phase of the return oil-based drilling fluid is approximately 0.5.

The diluted primarily solids phase is then separated by separator 102 into separated solids 112 and diluted separated fluids. Separator 102 may include, for example, shale shakers 102a, centrifuges 102b, augers, or other reparatory devices known in the art. One of ordinary skill in the art will appreciate that separator 102 may include one or more individual separators in series or parallel. In one embodiment, separator 102 may include a centrifuge 102b, specifically, a high speed vertical centrifuge or material dryer. One example of a commercially available dryer is the Verti-G Dryer from M-I L.L.C., a Schlumberger Company, Houston, Tex.

In one embodiment, the base oil fluid may be added to the primarily solids phase before the primarily solids phase is directed to the separator 102. In other embodiments, the base oil fluid may be added as the primarily solids phase enters the separator 102. For example, the separator 102 may include one or more spray nozzles. As the primarily solids phase is directed onto the separator 102, the one or more spray nozzles may spray the base oil fluid onto the primarily solids phase.

The diluted separated fluids may be directed from the separator 102 to mixing tank 104. A surfactant and/or polymer may then be added to the diluted separated fluids in the mixing tank 104 and processed as described above.

The separated solids 112 are directed from the separator 102 to a wash tank 114. A wash water is added to the separated solids 112 to further remove oil disposed on the separated solids. The wash water may be water used by the drilling fluid system. In this example, the wash water may be returned 122 to the drilling fluid system after washing the separated solids 112. The wash water may include chemical additives to help release entrained oil on the separated solids. The wash tank 114 may include an auger to continuously move the separated solids 112 through the tank 114 and to ensure proper mixing of the separated solids with the chemical additives.

Chemical additives that may be used in the wash water include, for example, surfactants, sodium silicate, zeolites, and other additives useful in the treatment of drilling waste. In some embodiments, the wash water may include biosurfactants which may include oil-digesting microbes. Such microbes digest organic contaminates on surfaces and in soils and convert hydrocarbons, oils, and greases into non-toxic compounds. Commercially available biosurfactants include REMEDY (Emergency Spill Solution), product code 22005, and ENDURANCE, product code 22008, both from Bionex Environmental Technologies, Inc., Pearland, Tex. In addition to microbes, the biosurfactant may further include at least one surfactant. Other flocculants and/or coagulants may also be used, including for example, inorganic coagulants including aluminum- and iron-based coagulants, such as aluminum chloride, poly(aluminum hydroxy)chloride, aluminum sulfate, ferric sulfate, ferric chloride, etc and combinations thereof. Still other coagulants may include water-soluble organic polymers that may be cationic, anionic, or non-ionic. Examples of cationic monomers may include diallyl dialkyl ammonium halides and dialkylaminoalkyl (meth)-acrylates and -acrylamides, (as acid addition or quaternary ammonium salts). In a particular embodiment, the coagulant may include poly diallyl dimethyl ammonium chloride, while in other embodiments, inorganic coagulants such as poly(aluminum hydroxy)chlorides may be used.

Treated solids 116 may be removed from the wash tank 114 and disposed of. In one embodiment, a binding agent (for example, fly ash) may be added to the treated solids to prepare the treated solids for use in construction 120. For example, the treated solids may be conveyed to a pug mill mixer. Reagents may be stored in pressured tanks or directed to the pug mill by cake hoppers. In some embodiments, water may be added. The pug mill pulverizes and mixes the treated solids with one or more mixing paddles. The mixed product, i.e., solidified cuttings, may then be moved to a storage area to allow the mixture to set. The mixture may then be used as a base for road or other construction. To meet certain environmental standards, the solidified cuttings may need to meet the parameter limitations provided in Table 1 below to be reused as road base material.

TABLE 1

Environments Limitations for Use as Road Base Material

| Parameter | Limitation |
| --- | --- |
| Compressive Strength by Method Tex-126-E | 35 psi minimum |
| SPLP by EPA Method 1312 | |
| Metals | |
| Arsenic | <0.500 mg/l |
| Barium | <100.00 |
| Cadmium | <1.00 |
| Chromium | <5.00 |
| Lead | <5.00 |
| Mercury | <0.20 |
| Selenium | <1.00 |
| Silver | <5.00 |
| Benzene | <0.50 |
| 1:4 Solid:Solution 7 Day Leachate Test | (LA 29-B Method) |
| Chlorides | <500.00 |

TABLE 1-continued

Environments Limitations for Use as Road Base Material

| Parameter | Limitation |
| --- | --- |
| TPH | <100.00 |
| pH (Standard Units) | 6-12 |

In other embodiments, the treated solids may be removed from the wash tank and placed in pit burials or land spread 118. Additives may be added to the treated solids before land spreading 118. For example, agricultural lime or calcium nitrate may be added to the treated solids for land spreading 118. The treated solids 116 may be land spread on site or moved to another well site or disposal site.

As discussed above, the wash water used to wash the separated solids 112 in the wash tank 114 may be reused 122 in the drilling fluid system. In some embodiments, dewatering polymers or coagulants 124, examples of which are discussed above, may be added to the used wash water to process the used wash water before being returned 122 to the drilling mud system. A centrifuge 126, (e.g., a decanting centrifuge) or other separator may be used to remove any solids phase from the used wash water before returning to the drilling mud system. The removed solids phase from the wash water may be added to the treated solids 116 and disposed of by land spreading, pit burial, or used for construction. Any contaminated used wash water, for example water including chlorides, may be disposed of through a disposal well 128.

Figure 2:
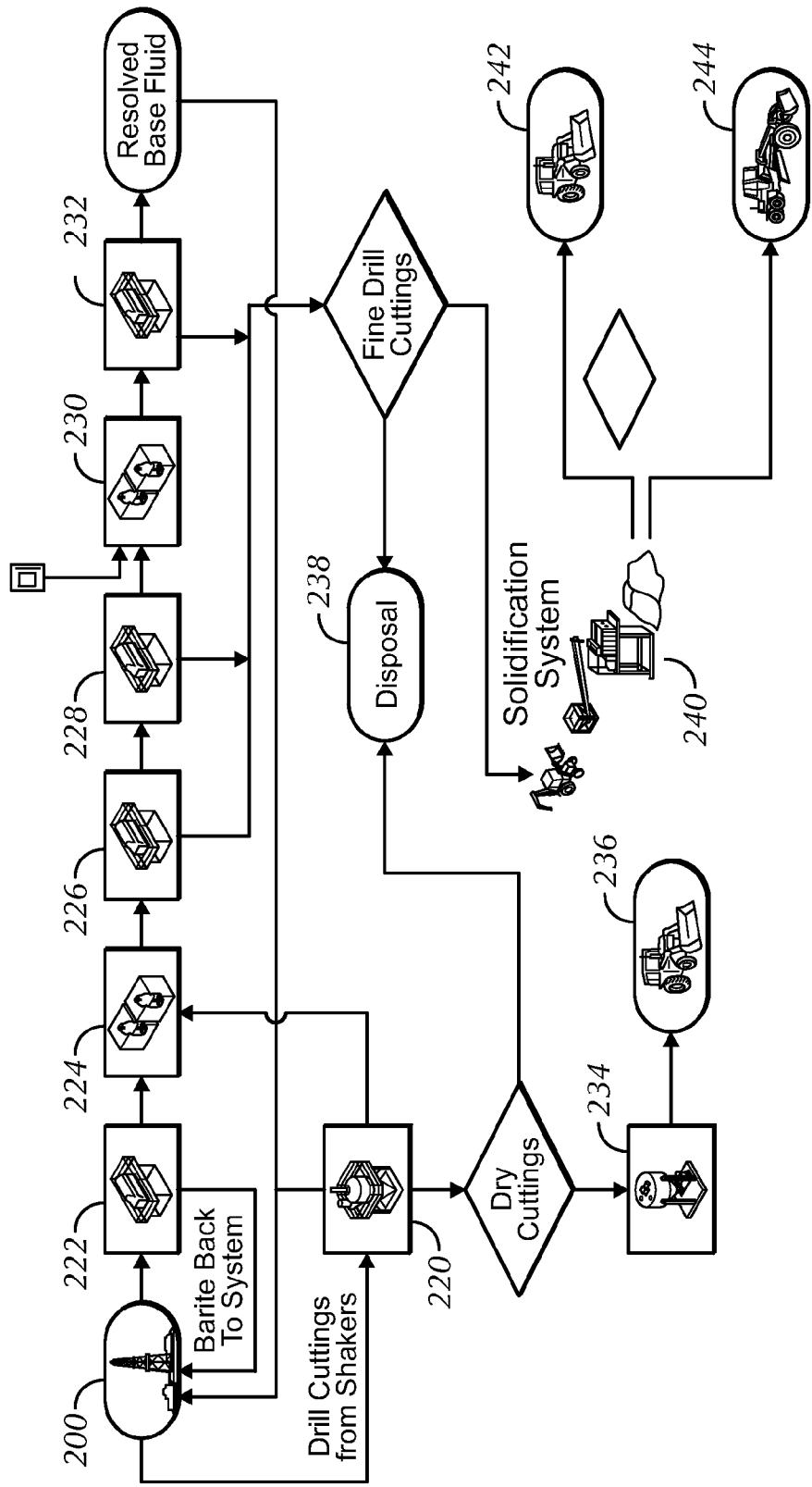
FIG. 2 is a diagram of a system for processing oilfield waste in accordance with embodiments of the present disclosure.

Referring now to FIG. 2, a system for processing oilfield waste in accordance with embodiments of the present disclosure is shown. A first separator (not shown) may be located at the drilling site 200 and receive a return oil-based drilling fluid from the well and divide the return oil-based drilling fluid into a primarily fluids phase and a primarily solids phase. The first separator may include, for example, a shale shaker. For example, the first separator may be a scalping shaker to provide a coarse separation of cuttings from the return drilling fluid. In other embodiments, other separators known in the art, such as centrifuges, cyclones, filters, etc., may be used to provide an initial separation of the primarily solids phase and the primarily fluids phase of the return drilling fluid. In some embodiments the first separator may include two or more separators operating in series or parallel. The primarily solids phase and the primarily fluids phase may then each be processed separately.

The primarily fluids phase of the return oil-based drilling fluid is directed to a second separator 222 and separated by the second separator 222 into a first effluent and a first residual. The first residual may include, for example, barite, other weighting agents or low gravity solids. In some embodiments, the primarily fluids phase may be processed through the second separator 222 at a rate of between 40 and 150 gpm. In some embodiments, the primarily fluids phase may be processed through the second separator 222 at a rate of between 60 and 110 gpm. In yet other embodiments, the primarily fluids phase may be processed through the second separator 222 at a rate of approximately 80 gpm. The second separator 222 may include a centrifuge. The centrifuge may be, for example, a decanting centrifuge, a vertical centrifuge, or any other centrifuge known in the art. In some embodiments, the centrifuge may be a low speed centrifuge that provides medium to high g-forces. For example, the low speed, medium/high g-force centrifuge may provide a speed of between 500 rpm and 2000 rpm with a g-force of between 600 and 1000 g. The centrifuge may be operated at a first speed. In one embodiment, the first speed may be between 1000 and 2000 rpm. In some embodiments, the centrifuge may be operated at a speed of between 1200 and 1600 rpm.

The first effluent is directed to a third separator 226 and separated by the third separator 226 into a second effluent and a second residual. In some embodiments, the first effluent may be processed through the third separator 226 at a rate of between 40 and 150 gpm. In some embodiments, the first effluent phase may be processed through the third separator 226 at a rate of between 60 and 110 gpm. In yet other embodiments, the first effluent may be processed through the third separator 226 at a rate of approximately 80 gpm. The third separator 226 may include a centrifuge. The centrifuge may be, for example, a decanting centrifuge, a vertical centrifuge, or any other centrifuge known in the art. In some embodiments, the centrifuge may be a high speed centrifuge that provides high g-forces. For example, the high speed, high g-force centrifuge may provide a speed of between 2000 rpm and 3500 rpm with a g-force of between 2000 and 2200 g. The centrifuge may be operated at a second speed. In some embodiments, the second speed may be greater than the first speed (i.e., the speed of the low speed, medium/high g-force centrifuge). In one embodiment, the second speed may be between 2000 and 3000 rpm. In some embodiments, the centrifuge may be operated at a speed of between 2400 and 2700 rpm.

The second effluent is directed to a fourth separator 228 and separated by the fourth separator 228 into a third effluent and a third residual. In some embodiments, the second effluent may be processed through the fourth separator 228 at a rate of between 40 and 150 gpm. In some embodiments, the second effluent may be processed through the fourth separator 228 at a rate of between 60 and 110 gpm. In yet other embodiments, the second effluent may be processed through the fourth separator 228 at a rate of approximately 80 gpm. The fourth separator 228 may include a centrifuge. The centrifuge may be, for example, a decanting centrifuge, a vertical centrifuge, or any other centrifuge known in the art. The centrifuge may be operated at a third speed. One of ordinary skill in the art will appreciate that instead of using a separate fourth separator 228 including a centrifuge, the second effluent may be returned to the third separator 226 having a high speed, high g-force centrifuge, and the speed of the centrifuge of the third separator 226 may be increased to the third speed. In some embodiments, the third speed may be greater than the first and second speeds. In one embodiment, the third speed may be between 2500 and 3500 rpm. In some embodiments, the centrifuge may be operated at a speed of between 2900 and 3200 rpm.

In some embodiments, a chemical additive may be added to the second effluent as the second effluent is directed to the fourth separator 228 (or returned to the third separator 226) or in the fourth separator 228 (or third separator 226). For example, a surfactant, polymer, or combination thereof, as described above, may be added to the second effluent to increase flocculation of particulate matter. In one embodiment, a water-based blend of a surfactant and a polymer may be added to the second effluent. For example, a water-based blend of two surfactants and a polymer may be used.

In some embodiments, the third effluent may be directed from the fourth separator 228 (or third separator 226) back to the active drilling fluid system at the rig 200. Additional additives, such as weighting agents, fluid loss control agents, pH and viscosity modifiers, or other drilling fluid additives known in the art may be added to the third effluent to prepare a drilling fluid before it is sent downhole. Further, a base oil fluid may be added to the third effluent to prepare a drilling fluid. In other embodiments, the third effluent may be further treated as discussed in more detail below.

In some embodiments, a base oil fluid may be added to one or more of the first effluent, the second effluent, and the third effluent. For example, a tank 230 may be provided to receive one or more of the first effluent, the second effluent, and the third effluent. A base oil fluid may be added to the tank 230. The volume of base oil fluid added to the first, second, and/or third effluent is selected such that the base oil fluid added effectively breaks the emulsion of the first, second, and/or third effluent. For example, in one embodiment, the ratio of the volume of the base oil fluid added to the volume of the first, second, and/or third effluent is greater than about 0.3. In other embodiments, the ratio of the volume of the base oil fluid added to the volume of the first, second, and/or third effluent is in a range of about 0.2 to 0.4, or a range of about 0.1 to 0.15, or a range of about 0.3 to 1.5. In yet other embodiments, the volume of the base oil fluid added to the volume of the first, second, and/or third effluent is approximately 1.0. In still other embodiments, the volume of the base oil fluid added to the volume of the first, second, and/or third effluent is approximately 0.5.

In some embodiments, a surfactant, polymer, or other chemical additive, as discussed above, may be added to one or more of the first effluent, the second effluent, and the third effluent. For example, a surfactant, polymer, or other chemical additive may be added to the tank 230, which receives one or more of the first effluent, the second effluent, and the third effluent. In some embodiments, the chemical additive may be a water-soluble demulsifier, for example a polyacrylamide. The base oil fluid may be added to the one or more of the first effluent, the second effluent, and the third effluent first and a surfactant, polymer, or other chemical additive may be added subsequently. In other embodiments, a base oil fluid may not be added, but one or more of a surfactant, polymer, or other chemical additive may be added to the one or more of the first effluent, the second effluent, and the third effluent.

A mixture of the one or more of the first effluent, the second effluent, and the third effluent and the base oil fluid and/or surfactant, polymer, or other chemical additive may then be directed to a fifth separator 232 and separated by the fifth separator 232 into a fourth effluent and a fourth residual, e.g. flocculated solids. In some embodiments, the mixture may be processed through the fifth separator 232 at a rate of between 40 and 150 gpm. In some embodiments, the mixture may be processed through the fifth separator 232 at a rate of between 60 and 110 gpm. In yet other embodiments, the mixture may be processed through the fifth separator 232 at a rate of approximately 80 gpm. The fifth separator 232 may include a centrifuge. The centrifuge may be, for example, a decanting centrifuge, a vertical centrifuge, or any other centrifuge known in the art. The centrifuge may be operated at a fourth speed. In one embodiment, the fourth speed may be greater than the first and second speed. In some embodiments, the fourth speed may be substantially similar to the third speed. In one embodiment, the fourth speed may be between 2500 and 3500 rpm. In some embodiments, the centrifuge may be operated at a speed of between 2900 and 3200 rpm.

The fourth effluent may be directed from the fifth separator 232 back to the active drilling fluid system at the rig 200. Additional additives, such as weighting agents, fluid loss control agents, pH and viscosity modifiers, or other drilling fluid additives known in the art may be added to the fourth effluent to prepare a drilling fluid before it is sent downhole. Further, a base oil fluid may be added to the fourth effluent to prepare a drilling fluid.

The primarily solids phase of the return drilling fluid is directed from the drilling rig 200 to a material dryer 220. Material dryer 220 may include, for example, a centrifuge or a vertical centrifuge as described above. Additionally, at least one of the first residual, second residual, and third residual may be directed to the material dryer 220. The material dryer 220 separates the primarily solids phase of the return drilling fluid, and in some embodiments at least one of the first residual, second residual, and third residual, into separated solids and separated fluids.

The separated solids may then be disposed of 238 or directed to a wash tank 234. A wash water, as described above, may be added to the separated solids to further remove oil disposed on the separated solids. The wash water may be a water used by the drilling fluid system. In this example, the wash water may be returned to the drilling fluid system after washing the separated solids. The wash water may include chemical additives to help release entrained oil on the separated solids. The wash tank 234 may include an auger to continuously move the separated solids through the wash tank 234 and to ensure proper mixing of the separated solids with the chemical additives.

Chemical additives that may be used in the wash water include, for example, surfactants, sodium silicate, zeolites, and other additives useful in the treatment of drilling waste. In some embodiments, the wash water may include biosurfactants which include oil-digesting microbes. Other flocculants and/or coagulants may also be used, including for example, inorganic coagulants including aluminum- and iron-based coagulants, such as aluminum chloride, poly(aluminum hydroxy)chloride, aluminum sulfate, ferric sulfate, ferric chloride, etc and combinations thereof. Still other coagulants may include water-soluble organic polymers that may be cationic, anionic, or non-ionic. Examples of cationic monomers may include diallyl dialkyl ammonium halides and dialkylaminoalkyl (meth)-acrylates and -acrylamides, (as acid addition or quaternary ammonium salts). In a particular embodiment, the coagulant may include poly diallyl dimethyl ammonium chloride, while in other embodiments, inorganic coagulants such as poly(aluminum hydroxy)chlorides may be used.

The washed separated solids may be removed from the wash tank and placed in pit burials or land spread 236. Additives may be added to the treated solids before land spreading 236. For example, agricultural lime or calcium nitrate may be added to the treated solids for land spreading 236. The washed separated solids may be land spread on site or moved to another well site or disposal site.

In one embodiment, the separated fluids from the material dryer 220 may be combined with the first effluent from the second separator 222. For example, the separated fluids from the material dryer 220 may be directed to a mixing tank 224 and the first effluent from the second separator 222 may be directed to mixing tank 224. A mixture of the first effluent and the separated fluids may then be directed to the third separator 226 and processed as described above.

One or more of the first, second, third, and fourth residuals may be directly disposed of 238. In some embodiments, a binding agent (for example, fly ash) may be added to one or more of the first, second, third, and fourth residuals to prepare the residuals for use in construction 244. For example, the residual may be conveyed to a pug mill mixer 240. Reagents may be stored in pressured tanks or directed to the pug mill by cake hoppers. In some embodiments, water may be added. The pug mill pulverizes and mixes the residuals with one or more mixing paddles. The mixed residuals may then be moved to a storage area to allow the mixed residuals to set. The mixed residuals may then be used as a base for road or other construction 244. In other embodiments, the one or more of the first, second, third, and fourth residuals may be removed placed in pit burials or land spread 242. Additives may be added to the treated solids before burying or land spreading 242. For example, agricultural lime or calcium nitrate may be added to the residuals for land spreading 242. The residuals may be land spread on site or moved to another well site or disposal site.

Figure 3:
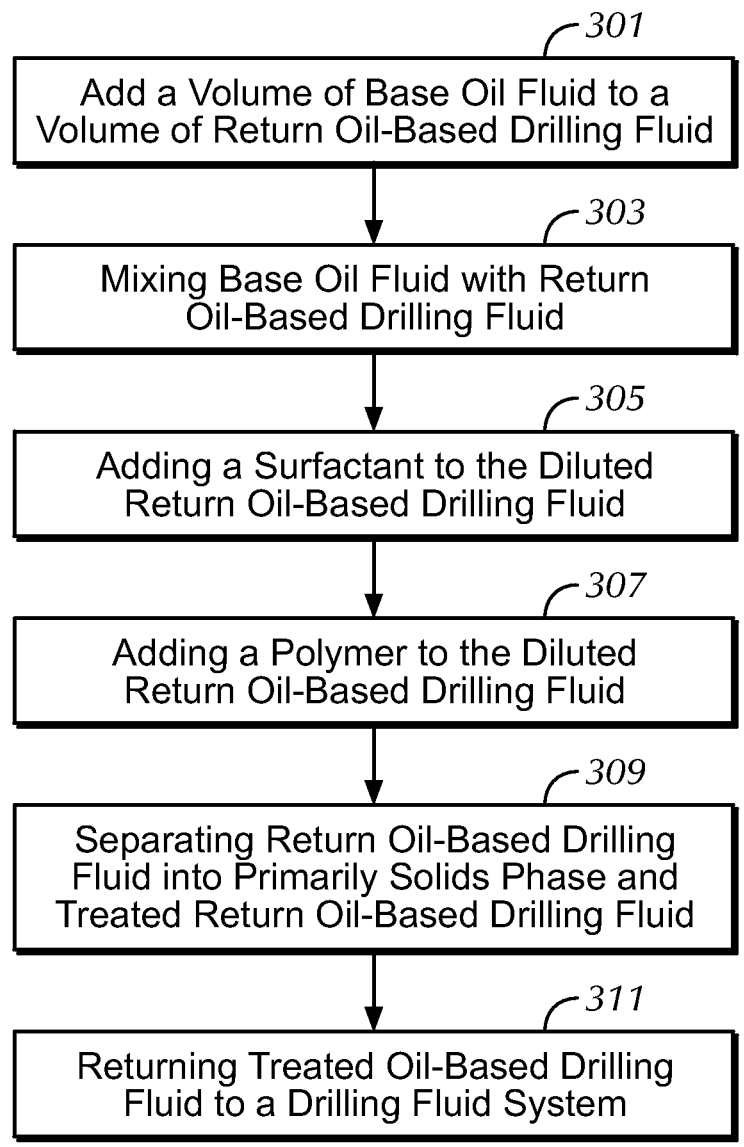
FIG. 3 is a flow chart of a method of processing a return oil-based drilling fluid in accordance with embodiments of the present disclosure.

Referring now to FIG. 3, a flow chart of a method of processing a return oil-based drilling fluid is shown. Initially, a volume of base oil fluid is added to a volume return oil-based drilling fluid 301. The ratio of the volume of the base oil fluid added to the volume of return oil-based drilling fluid may vary. For example, the ratio of the volume of the base oil fluid added to the volume of return oil-based drilling fluid may be greater than 0.3, between 0.5 and 1.2, or approximately 1.0, or 0.5. The base oil fluid is mixed 303 with the return oil-based drilling fluid to form a diluted return oil-based drilling fluid. The base oil fluid and return oil-based drilling fluid may be mixed in a mixing tank as known in the art, for example, mixing tanks with agitators, paddles, or other mixing devices. A surfactant, as described above, may be added 305 to the diluted return oil-based drilling fluid. A polymer, as described above, may be added 307 to the diluted return oil-based drilling fluid. One of ordinary skill in the art will appreciate that the order of adding the surfactant and polymer may vary. That is, the surfactant may be added before the polymer in some embodiments, while in others, the polymer may be added before the surfactant. In yet other embodiments, the surfactant and polymer may be added simultaneously. A return oil-based drilling fluid is separated into a primarily solids phase and a treated return oil-based drilling fluid 309. The treated return oil-based drilling fluid may be returned to a drilling fluid system 311.

Figure 4:
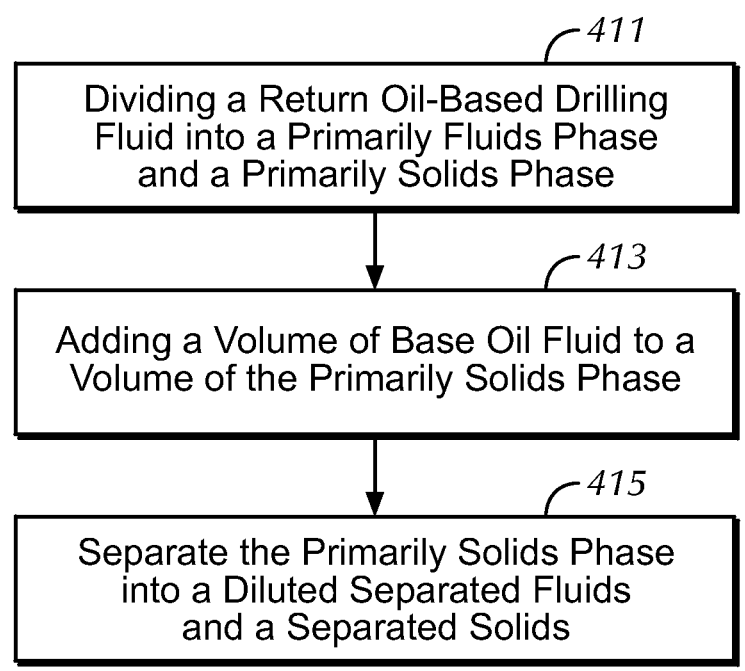
FIG. 4 is a flow chart of a method of processing a return oil-based drilling fluid in accordance with embodiments of the present disclosure.

Referring now to FIG. 4, a flow chart of a method of processing a return oil-based drilling fluid is shown. Initially, the return oil-based drilling fluid is divided 411 into a primarily fluids phase and a primarily solids phase. In some embodiments, a primarily solids phase may be obtained from a storage vessel or transport container. For example, drill cuttings removed from a return oil-based drilling fluid from another work site may be stored or transported in a vessel. A volume of base oil fluid is added to a volume of the primarily solids phase 413. The ratio of the volume of the base oil fluid added to the volume of primarily solids phase may vary. For example, the ratio of the volume of the base oil fluid added to the volume of primarily solids phase may be greater than 0.3, between 0.2 and 0.4, 0.1 and 0.15, or 0.5 and 1.2, or approximately 1.0, or 0.5. The primarily solids phase is separated 415 into a diluted separated fluids and a separated solids.

Figure 5:
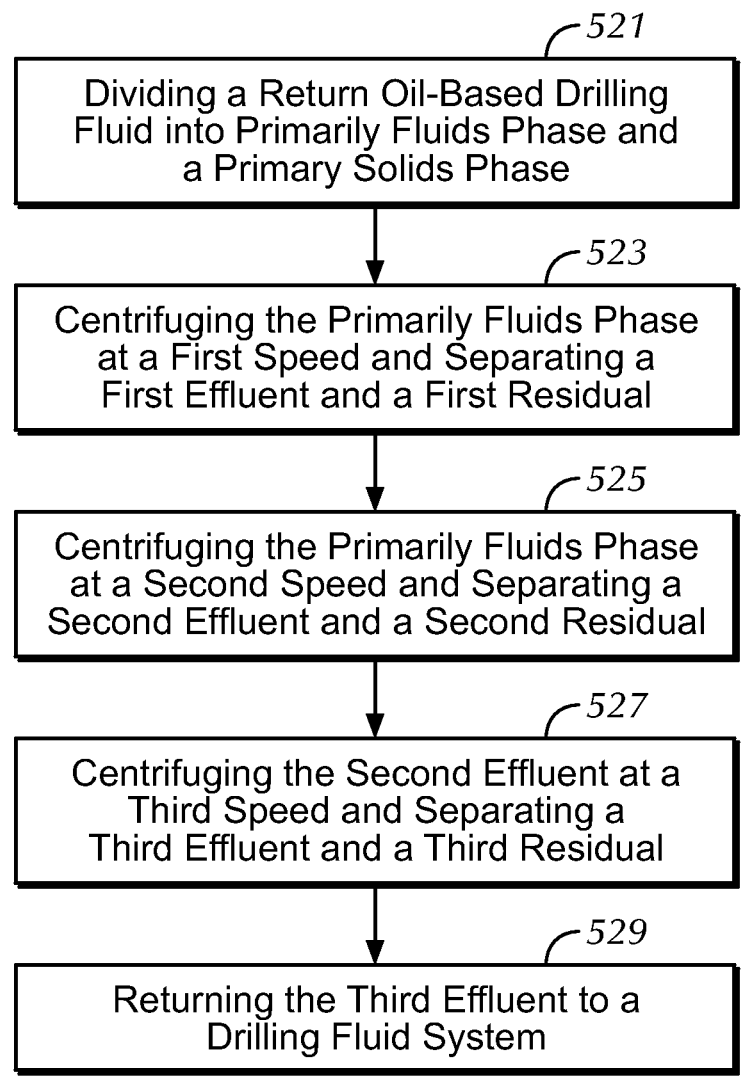
FIG. 5 is a flow chart of a method of processing a return oil-based drilling fluid in accordance with embodiments of the present disclosure.

Referring now to FIG. 5, a flow chart of a method of processing a return oil-based drilling fluid is shown. Initially, the return oil-based drilling fluid is divided 521 into a primarily fluids phase and a primarily solids phase. The primarily fluids phase is centrifuged 523 at a first speed and separated into a first effluent and a first residual. The first effluent is centrifuged 525 at a second speed and separated into a second effluent and a second residual. The second effluent is centrifuged 527 at a third speed and separated into a third effluent and a third residual. The third effluent may be returned to a drilling fluid system 529. In some embodiments, a base oil fluid, surfactant, polymer, and/or other chemical additive, as discussed above, may be added to one or more of the first, second, and third effluents to form a mixture. The mixture may be centrifuged at a fourth speed and separated into a fourth effluent and a fourth residual. The fourth effluent may be returned to a drilling fluid system.

Embodiments disclosed herein may provide enhanced separation of solids phase and fluids phase of a return drilling fluid. Some embodiments disclosed herein may provide a solids phase separated from a return drilling fluid that is cleaner and dryer and may be well suited for various construction and containment applications. Additionally, certain embodiments disclosed herein may provide cheaper and/or faster processing of return drilling fluids. Specifically, fewer chemical additives may be used for processing return drilling fluids according to methods described herein. Processing of return drilling fluids in accordance with methods described herein may also allow for drill solids or cuttings to be disposed of onsite without costly procedures for removal or storage offsite.

Although only a few example embodiments have been described in detail above, those skilled in the art will readily appreciate that many modifications are possible in the example embodiments without materially departing from the scope of this application. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed:

1. A method of processing a return oil-based drilling fluid comprising:
    mixing a volume of a base oil fluid to the return oil-based drilling fluid to break an emulsion of the return oil-based drilling fluid and form a diluted return oil-based drilling fluid, wherein the ratio of the volume of base oil fluid added to a volume of the return oil-based drilling fluid is between about 0.1 and 0.4;
    separating the diluted return oil-based drilling fluid into a primarily solids phase and a primarily fluids phase;
    adding a surfactant to the primarily fluids phase; and
    adding a polymer to the primarily fluids phase.

2. The method of claim 1, further comprising mixing a second volume of the base oil fluid to the primarily fluids phase and separating a separated solids phase and a treated return oil-based fluid from the primarily fluids phase.

3. The method of claim 1, wherein the separating comprises directing the diluted return oil-based drilling fluid to at least one of a centrifuge, a settling tank, and a coalescer.

4. The method of claim 2, further comprising returning the treated return oil-based drilling fluid to a drilling fluid system.

5. The method of claim 2, further comprising returning the treated return oil-based drilling fluid to a mixing tank as the base oil fluid.

6. The method of claim 1, wherein the polymer is a dry polymer.

7. The method of claim 6, further comprising hydrating the dry polymer before adding the polymer to the return oil-based drilling fluid by mixing water with the dry polymer.

8. The method of claim 1, further comprising drying the primarily solids phase to produce a separated solids phase.

9. The method of claim 8, further comprising disposing of the separated solids phase.

10. The method of claim 1, further comprising washing the primarily solids phase to form a treated solids phase.

11. The method of claim 10, further comprising adding a binding agent to the treated solids phase to form a construction material.

12. The method of claim 10, further comprising disposing of the treated solids phase.

13. The method of claim 10, wherein the washing comprises adding a wash fluid to the primarily solids phase to form a wash stream.

14. The method of claim 13, further comprising returning the wash stream to a drilling fluid system.

* * * * *